United States Patent
Jiang

(10) Patent No.: US 10,321,693 B1
(45) Date of Patent: Jun. 18, 2019

(54) AUTOMATIC CRAYFISH WASHING MACHINE

(71) Applicant: Bozhang Jiang, Longyan (CN)

(72) Inventor: Bozhang Jiang, Longyan (CN)

(*) Notice: Subject to any disclaimer, the term of this patent is extended or adjusted under 35 U.S.C. 154(b) by 0 days.

(21) Appl. No.: 16/039,750

(22) Filed: Jul. 19, 2018

(51) Int. Cl.
- A22C 29/00 (2006.01)
- A22C 29/02 (2006.01)
- A22C 17/08 (2006.01)

(52) U.S. Cl.
CPC ............ *A22C 29/021* (2013.01); *A22C 17/08* (2013.01)

(58) Field of Classification Search
CPC ................... A22C 29/00; A22C 29/02; A22C 29/021–29/027
USPC .................................................. 452/1, 7, 10
See application file for complete search history.

(56) References Cited

U.S. PATENT DOCUMENTS

| | | | | |
|---|---|---|---|---|
| 4,121,322 A * | 10/1978 | Rutledge | ............. | A22C 29/025 452/5 |
| 4,393,543 A * | 7/1983 | Martin | ................... | A22C 29/02 452/3 |
| 4,692,965 A * | 9/1987 | Stephenson | .......... | A22C 29/028 452/179 |
| 4,862,794 A * | 9/1989 | Lapeyre | ............... | A22C 29/026 99/443 C |
| 5,195,921 A * | 3/1993 | Ledet | ................... | A22C 29/021 452/2 |
| 5,518,444 A * | 5/1996 | Hulin | ................... | A22C 29/026 452/5 |
| 5,928,072 A * | 7/1999 | Fulcher | ................ | A22C 29/025 452/1 |
| 7,179,160 B2 * | 2/2007 | Hulin | ................... | A22C 29/005 452/2 |
| 8,147,298 B2 * | 4/2012 | Nolsoe | ................... | A22C 25/14 452/106 |

* cited by examiner

*Primary Examiner* — Richard T Price, Jr.
(74) *Attorney, Agent, or Firm* — Myers Bigel, P.A.

(57) ABSTRACT

The present application provides an automatic crayfish washing machine, comprising: a first water tank, a second water tank, a first brush, a second brush, a reducer, a coupling, a motor, a frame, a crayfish container, and a circulating water system. With the washing machine, time is substantially reduced with good washing effect.

4 Claims, 1 Drawing Sheet

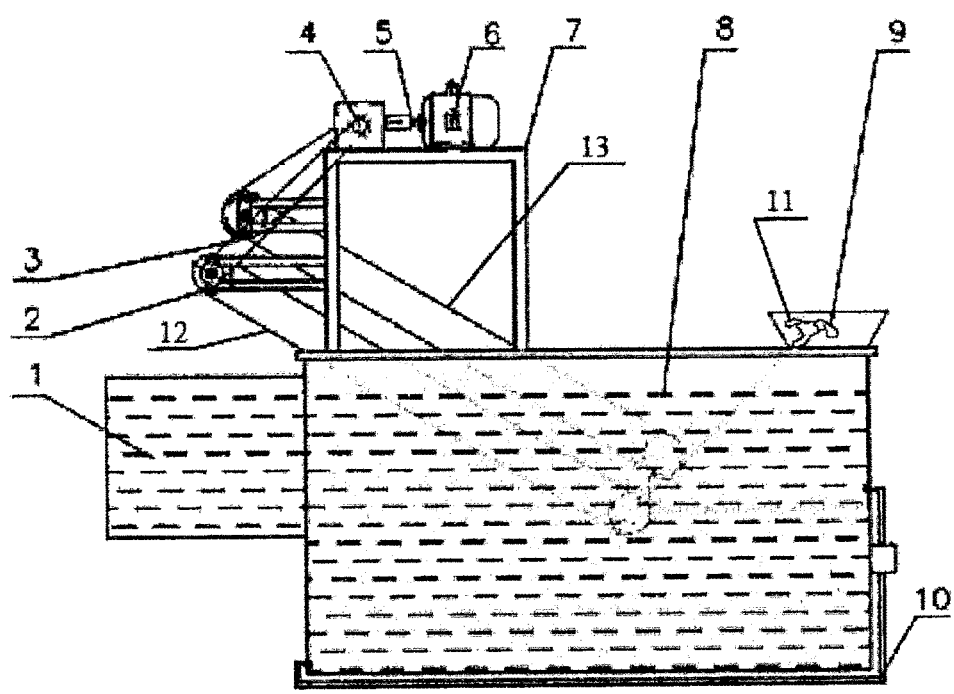

AUTOMATIC CRAYFISH WASHING MACHINE

FIELD OF THE INVENTION

The present application relates to a washing machine, in particular to an automatic crayfish washing machine.

BACKGROUND OF THE INVENTION

Crayfish is a popular food that is very nutritious and has medicinal value. With the improvement of people's material living standards, the demand for crayfish is increasing. Washing crayfish is an important part. Washing crayfish manually takes time and labor. If the crayfish is unclean, the microbial index exceeds the standard, which will cause many consumers to stay away from crayfish.

SUMMARY OF THE INVENTION

In order to solve the above problems, the present application provides an automatic crayfish washing machine.

The automatic crayfish washing machine comprises: a first water tank, a second water tank, a first brush, a second brush, a reducer, a coupling, a motor, a frame, a crayfish container, and a circulating water system; wherein the frame is disposed on the left of the first water tank, and the motor is mounted on the frame; the motor is connected to the reducer through the coupling; the crayfish container is disposed on the right of the first water tank, the crayfish container is used to storage the crayfish to be washed, and the crayfish container is provided with an outlet at the bottom; the first brush is fixed to the frame at one end, and the other end is fixed under the outlet of the crayfish container, a first belt pulley is mounted on the first brush, and the pulley is connected to the reducer through the belt; the second brush is disposed above the first brush, the second brush is fixed on the frame at one end, and the other end is disposed above the outlet of the crayfish container, a second belt pulley is mounted on the second brush, and the pulley is connected to the reducer through the belt; the second water tank is disposed under the first brush; one end of the circulating water system is installed on the left of the first water tank, the other end is installed on the right of the first water tank, and a water pump is disposed in the circulating water system.

Further, said first brush has a rotational speed of 1-20 r/min.

Further, said second brush has a rotational speed of 100-200 r/min.

Further, there is a filter disposed before the circulating water system, for filtering impurities in the first water tank.

With the automatic crayfish washing machine, the crayfish can be washed with the first bush for the first time, and the first brush can also transport the crayfish along it to the second water tank and be washed for the second time with the second brush. With the circulating water system, the water can be reused after filtering the impurities in the water with the filter. With the washing machine, time is substantially reduced with good washing effect.

BRIEF DESCRIPTION OF THE DRAWINGS

FIG. 1 is a schematic view of one embodiment of the structure of the present application.

In the FIGURE, 1—the second water tank, 2—the first brush, 3—the second brush, 4—the reducer, 5—the coupling, 6—the motor, 7—the frame, 8—the first water tank, 9—the crayfish container, 10—the circulating water system.

DETAILED DESCRIPTION OF THE EMBODIMENTS

One embodiment of the present application will be described in detail below with reference to the accompanying drawings.

As shown in the FIGURE, the automatic crayfish washing machine comprises a first water tank 8, a second water tank 1, a first brush 2, a second brush 3, a reducer 4, a coupling 5, a motor 6, a frame 7, a crayfish container 9, and a circulating water system 10; wherein the frame 7 is disposed on the left of the first water tank 8, and the motor 6 is mounted on the frame 7; the motor 6 is connected to the reducer 4 through the coupling 5; the crayfish container 9 is disposed on the right of the first water tank 8, the crayfish container 9 is used to storage the crayfish 11 to be washed, and the crayfish container 9 is provided with an outlet at the bottom; the first brush 2 is fixed to the frame 7 at one end, and the other end is fixed under the outlet of the crayfish container 9, a first belt pulley is mounted on the first brush 2, and the first pulley is connected to the reducer 4 through the first belt 12; the second brush 3 is disposed above the first brush 2, the second brush 3 is fixed on the frame 7 at one end, and the other end is disposed above the outlet of the crayfish container 9, a second belt pulley is mounted on the second brush 3, and the second pulley is connected to the reducer 4 through the second belt 13; the second water tank 1 is disposed under the first brush 2; one end of the circulating water system 10 is installed on the left of the first water tank 8, the other end is installed on the right of the first water tank 8, and a water pump is disposed in the circulating water system 10.

In operation, water is filled appropriately to the first water tank 8, and then the crayfish 11 is added into the crayfish container 9, and the water pump 10 is turned on while the motor 6 is turned on, so that the water in the first water tank begins to circulate. The crayfish 11 in the crayfish container 9 enters a tunnel formed by the second brush 2 from the outlet along with the water flow, and is washed and conveyed under the action of the first brush 2 and the second brush 3. The crayfish 11 washed in the first water tank is conveyed to the second water tank 1 and is washed for the second time.

The above is just a preferred embodiment of the present application, and is not intended to limit it in any way. Although the present application has been disclosed in the above preferred embodiments, it is not intended to limit the present application. Those skilled in the art can make some modifications to the embodiment without departing from the technical solution of the present application. Any simple modification, equivalent change made to the above embodiment in accordance with the technical spirit of the present application is still within the scope of the present application.

That which is claimed is:

1. An automatic crayfish washing machine, comprising: a first water tank, a second water tank, a first brush, a second brush, a reducer, a coupling, a motor, a frame, a crayfish container, and a circulating water system; wherein the frame is disposed on the left of the first water tank, and the motor is mounted on the frame; the motor is connected to the reducer through the coupling; the crayfish container is disposed on the right of the first water tank, the crayfish container is used to storage the crayfish to be washed, and the crayfish container is provided with an outlet at the bottom; the first brush is fixed to the frame at one end, and the other end of the first brush is fixed under the outlet of the crayfish container, a first belt pulley is mounted on the first brush, and the first belt pulley is connected to the reducer through a first belt; the second brush is disposed above the first brush, the second brush is fixed on the frame at one end, and the other end of the second brush is disposed above the outlet of the crayfish container, a second belt pulley is mounted on the second brush, and the second belt pulley is connected to the reducer through a second belt; the second water tank is disposed under the first brush; one end of the circulating water system is installed on the left of the first water tank, the other end of the circulating water system is installed on the right of the first water tank, and a water pump is disposed in the circulating water system.

2. An automatic crayfish washing machine according to claim 1, wherein said first brush has a rotational speed of 1-20 r/min.

3. An automatic crayfish washing machine according to claim 1, wherein said second brush has a rotational speed of 100-200 r/min.

4. An automatic crayfish washing machine according to claim 1, wherein there is a filter disposed before the circulating water system, for filtering impurities in the first water tank.

\* \* \* \* \*